(12) United States Patent
Vukosavljevic et al.

(10) Patent No.: US 8,751,550 B2
(45) Date of Patent: Jun. 10, 2014

(54) FREEFORM MATHEMATICAL COMPUTATIONS

(75) Inventors: Magdalena Vukosavljevic, Belgrade (RS); Ivan Stojiljkovic, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 12/797,492

(22) Filed: Jun. 9, 2010

(65) Prior Publication Data

US 2011/0307535 A1   Dec. 15, 2011

(51) Int. Cl.
*G06F 3/01*   (2006.01)

(52) U.S. Cl.
USPC ........................................................ 708/141

(58) Field of Classification Search
None
See application file for complete search history.

(56) References Cited

U.S. PATENT DOCUMENTS

| | | | | |
|---|---|---|---|---|
| 5,428,805 | A | * | 6/1995 | Morgan ........................ 708/141 |
| 5,481,626 | A | * | 1/1996 | Matsubayashi ............... 382/189 |
| 5,627,914 | A | | 5/1997 | Pagallo |
| 5,655,136 | A | | 8/1997 | Morgan |
| 6,212,297 | B1 | | 4/2001 | Sklarew |
| 7,181,068 | B2 | | 2/2007 | Suzuki et al. |
| 7,561,737 | B2 | | 7/2009 | Zou et al. |
| 2006/0209042 | A1 | | 9/2006 | Cohen et al. |
| 2008/0240570 | A1 | | 10/2008 | Shi et al. |
| 2008/0260240 | A1 | | 10/2008 | Vukosavljevic et al. |

OTHER PUBLICATIONS

"Handwritten Math Recognition in Windows 7", *Retrieved from*: <http://reference.wolfram.com/mathematica/tutorial/HandwrittenMathRecognition.html> on Jun. 9, 2010, 5 pages.

Labahn, George et al., "MathBrush: A System for Doing Math on Pen-Based Devices", *Proceedings of the Eighth IAPR International Workshop on Document Analysis Systems*, Available at <http://www.cs.uwaterloo.ca/~smaclean/das2008.pdf>,(2008),8 pages.

Sondag, Taylor "Mathematical Handwriting Recognition with a Neural Network and Calculation", Available at <http://faculty.mckendree.edu/kian_pokorny/Course_Pages/CSI490/sondagSeminarPaper.pdf>,(Apr. 22, 2004),13 pages.

"Foreign Office Action", Chinese Application No. 201110162286.X, (Dec. 5, 2012), 11 pages.

"Foreign Office Action", CN Application No. 201110162286.X, (Jul. 12, 2013),10 pages.

Laviola, Jr., Joseph J., "Advances in Mathematical Sketching: Moving Toward the Paradigm's Full Potential", *IEEE Computer Graphics and Applications*, (Jan. 2007),pp. 38-48.

"Foreign Office Action", Chinese Application No. 201110162286.X, Dec. 19, 2013, 10 Pages.

* cited by examiner

*Primary Examiner* — David H Malzahn
(74) *Attorney, Agent, or Firm* — Micah Goldsmith; Glen Johnson; Micky Minhas (57) ABSTRACT

Freeform mathematical computations are described. In implementations, an input is recognized as a freeform selection of an area of a user interface output by a computing device. Text is identified that is associated with the area defined by the freeform selection and that includes one or more numbers. A mathematical computation is performed that involves the one or more numbers.

20 Claims, 8 Drawing Sheets

FREEFORM MATHEMATICAL COMPUTATIONS

BACKGROUND

The amount of functionality that is available from computing devices is ever increasing, such as from mobile devices, game consoles, televisions, set-top boxes, personal computers, and so on. However, traditional techniques that were employed to interact with the computing devices may become less efficient as the amount of functionality increases.

For example, inclusion of additional functions in a menu may add additional levels to the menu as well as additional choices at each of the levels. Additionally, inclusion of these features using traditional techniques may force the user to navigate through menus to access the features "away" from the current user interface. Consequently, the addition of these functions in the menu may frustrate users by the sheer number of choices of functions and thereby result in decreased utilization of both the additional functions as well as the device itself that employs the functions. Thus, traditional techniques that were used to access the functions may limit the usefulness of the functions and the device as a whole to a user of the computing device.

SUMMARY

Freeform mathematical computations are described. In implementations, an input is recognized as a freeform selection of an area of a user interface output by a computing device. Text is identified that is associated with the area defined by the freeform selection and that includes one or more numbers. A mathematical is performed computation that involves the one or more numbers.

In implementations, an input is recognized as a freeform selection of an area of a user interface output by a computing device. Ink strokes associated with the area are converted into text by the computing device. The text is displayed within the user interface of the computing device to verify that the converting was performed successfully, the text including one or more numbers. A mathematical computation is performed that involves the one or more numbers.

In implementations, one or more computer-readable media comprise instructions that, responsive to execution on a computing device, cause the computing device to perform operations comprising recognizing an input as a freeform selection that at least partially encloses an area of a user interface output by the computing device, converting one or more Ink strokes within the area into text by the computing device, identifying a mathematical computation to be performed from at least one ink strokes included in the area, displaying the text within the user interface of the computing device to verify that the converting was performed successfully, the text including one or more numbers, and performing the identified mathematical computation using the one or more numbers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As the amount of functionality that is available from computing devices increases, traditional techniques that were employed to interact with the computing devices may become less efficient. For example, inclusion of additional features using traditional techniques may force the user to navigate through an ever increasing amount of menus to access the features and accordingly force the user to navigate ever further "away" from a current user interface. Thus, traditional techniques that were used to access the functions may limit the usefulness of the functions and the device as a whole to a user of the computing device.

Freeform mathematical computation techniques are described. In implementations, a computing device is configured to receive freeform inputs, such as ink strokes (e.g., digital handwritten ink) drawn in conjunction with a user interface on a display device of the computing device and recognized using touchscreen functionality. The computing device is also configured to recognize a freeform selection of an area of the user interface, such as by circling the area. Digital ink strokes within the area may then be converted into text, which may serve as a basis of a mathematical computation such as to add numbers represented by the ink strokes. A result of the mathematical computation may then be displayed in the user interface. Further, in implementations the result is displayed to mimic the handwriting of the original user's handwritten strokes (e.g., in size and style). Thus, in this way a user may readily perform mathematical computations in an intuitive manner without navigating away from the user interface, further discussion of which may be found in relation to the following sections.

In the following discussion, an example environment is first described that is operable to employ the computation techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
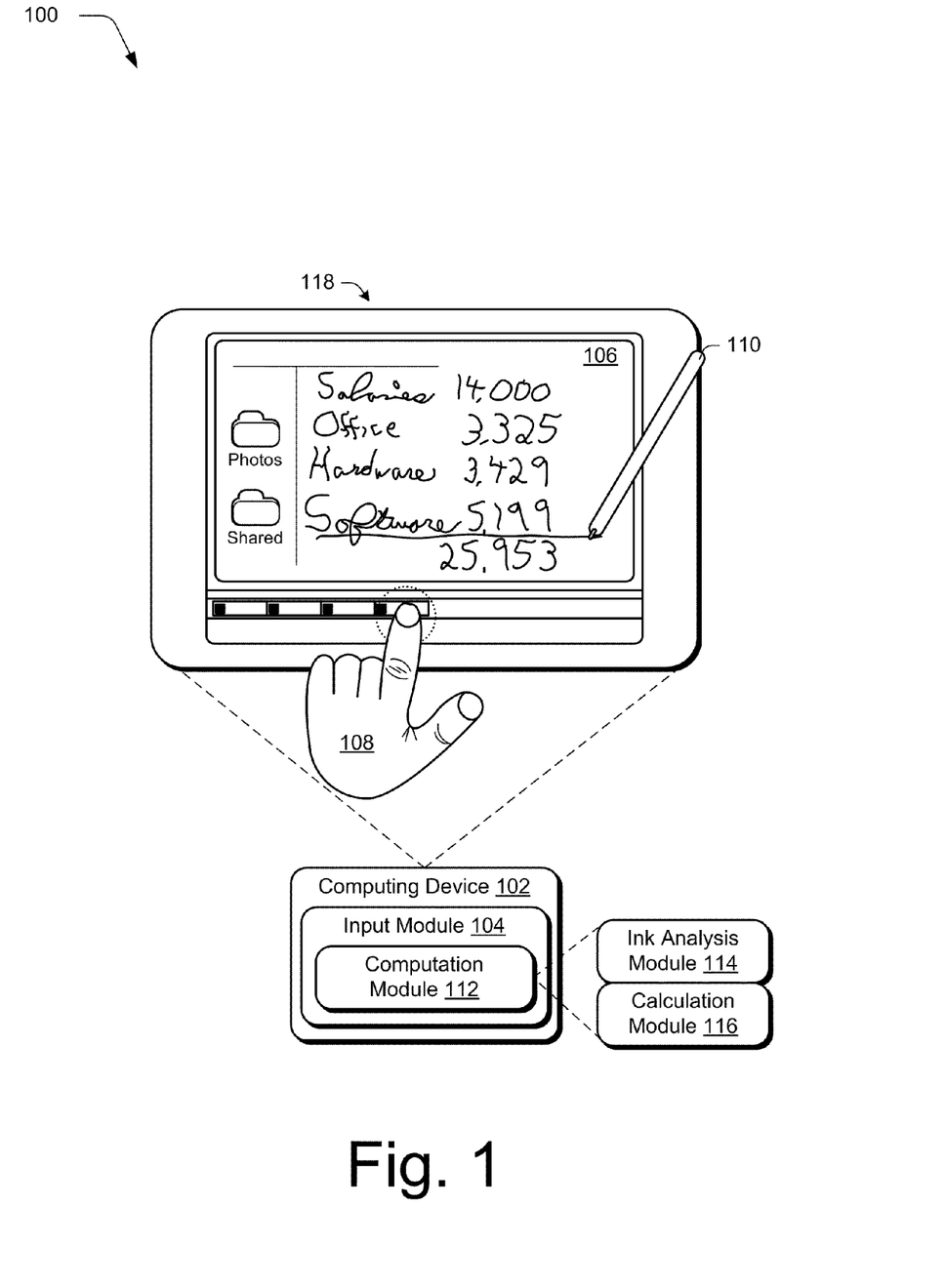
FIG. 1 is an illustration of an environment in an example implementation that is operable to employ computation techniques described herein.

FIG. 1 is an illustration of an environment 100 in an example implementation that is operable to employ computation techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 108 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI). A variety of other example techniques for distinguishing touch and stylus inputs are contemplated, further discussion of which may be found in relation to FIG. 8.

Thus, the input module 104 may support a variety of different gesture techniques by recognizing and leveraging a division between stylus and touch inputs. For instance, the input module 104 may be configured to recognize the stylus as a writing tool, whereas touch is employed to manipulate objects displayed by the display device 106. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures.

The computing device 102 is further illustrated as including a computation module 112 that is representative of functionality involving freeform mathematical computations. For example, the computation module 112 may include an ink analysis module 114 and a calculation module 116. The ink analysis module 114 is representative of functionality of the computing device 102 to convert ink strokes (e.g., digital handwriting ink), such as the ink strokes 118 illustrated as input via the display device 106 of the computing device 102, into text. The calculation module 116 is representative of functionality of the computing device 102 to process the text, such as to identify a mathematical computation from the text and perform the operation on numbers also included in the text. In this way, the computing device 102 may be configured to automatically perform mathematical computations on freeform text input without accessing a menu or navigating "away" from a current view in a user interface output on the display device 106. The ink strokes may be entered in a variety of ways, such as via a finger of the user's hand 108, the stylus 110, via a cursor control device, a touchpad, and so on. Further discussion of the computations may be found in relation to the computation implementation section below.

Although the following discussion may describe specific examples of touch and stylus inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the techniques are illustrated as being input using touchscreen functionality, the techniques may be input using a variety of different techniques by a variety of different devices.

Figure 2:
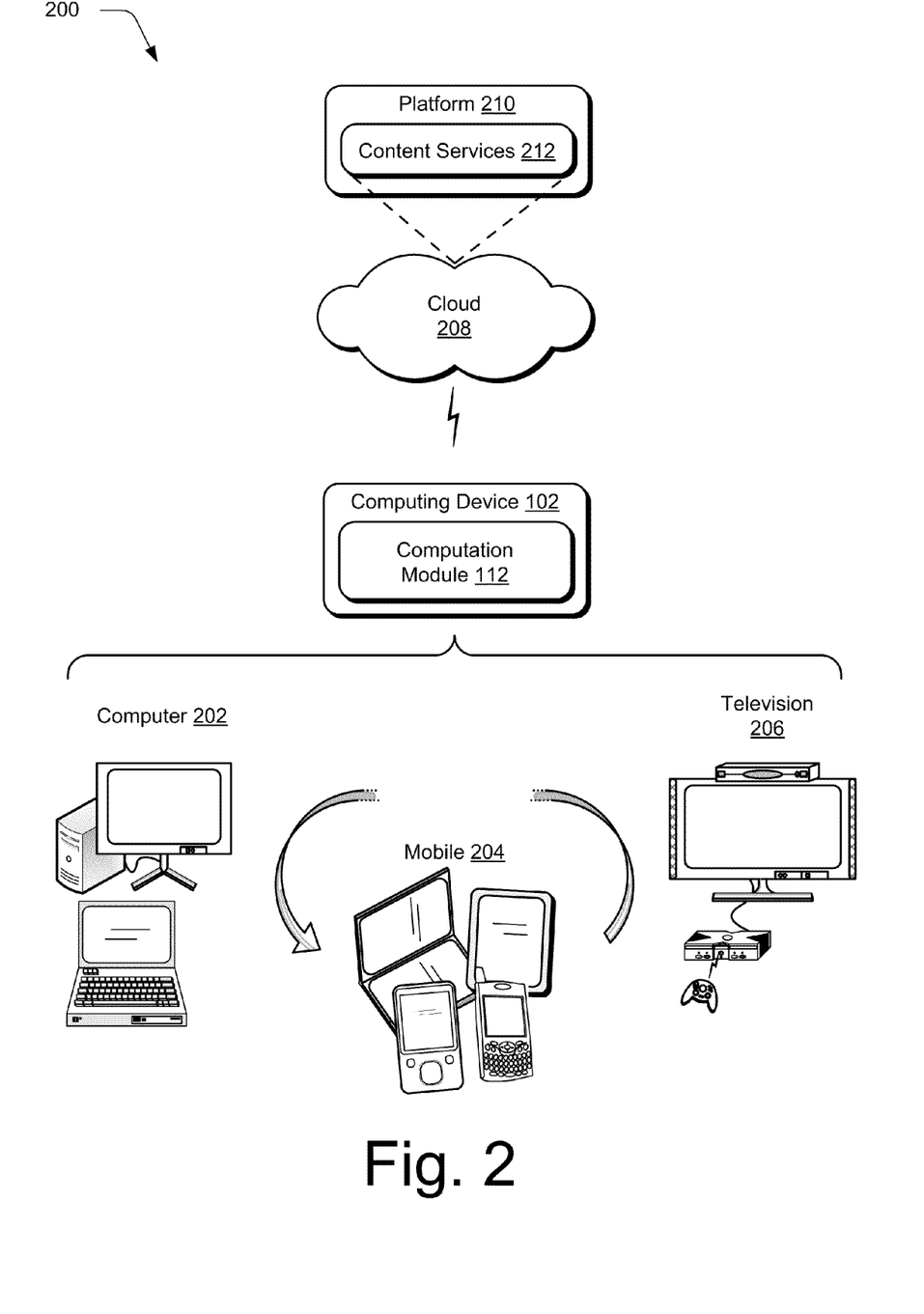
FIG. 2 illustrates an example system showing a computation module of FIG. 1 as being implemented in an environment where multiple devices are interconnected through a central computing device.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to each of the devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen computer, laptop computer, netbook, and so on.

The computing device 102 may also be implemented as the mobile 202 class of device that includes mobile devices, such as a mobile phone, portable music player, portable gaming device, a tablet computer (e.g., such as a dual-screen tablet as illustrated), a multi-screen computer, and so on. The computing device 102 may also be implemented as the television 206 class of device that includes devices having or connected to generally larger screens in casual viewing environments. These devices include televisions, set-top boxes, gaming consoles, and so on. The computation techniques described herein may be supported by these various configurations of the computing device 102 and are not limited to the specific examples of computation techniques described herein.

The cloud 208 includes and/or is representative of a platform 210 for content services 212. The platform 210 abstracts underlying functionality of hardware (e.g., servers) and software resources of the cloud 208. The content services 212 may include applications and/or data that can be utilized while computer processing is executed on servers that are remote from the computing device 102. Content services 212 can be provided as a service over the Internet and/or through a subscriber network, such as a cellular or WiFi network.

The platform 210 may abstract resources and functions to connect the computing device 102 with other computing devices. The platform 210 may also serve to abstract scaling of resources to provide a corresponding level of scale to encountered demand for the content services 212 that are implemented via the platform 210. Accordingly, in an interconnected device embodiment, implementation of functionality of the computation module 112 may be distributed throughout the system 200. For example, the computation module 112 may be implemented in part on the computing device 102 as well as via the platform 210 that abstracts the functionality of the cloud 208. For example, functionality of the ink analysis module 114 may be provided by the content services 212 to convert ink strokes to text, a result of which may then be communicated back to the computing device 102 for further processing, such as to perform the mathematical computation.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the computation techniques described below are plat-form-independent, meaning that the techniques may be implemented on a variety of commercial computing platforms having a variety of processors.

Computation Implementation Examples

Figure 3:
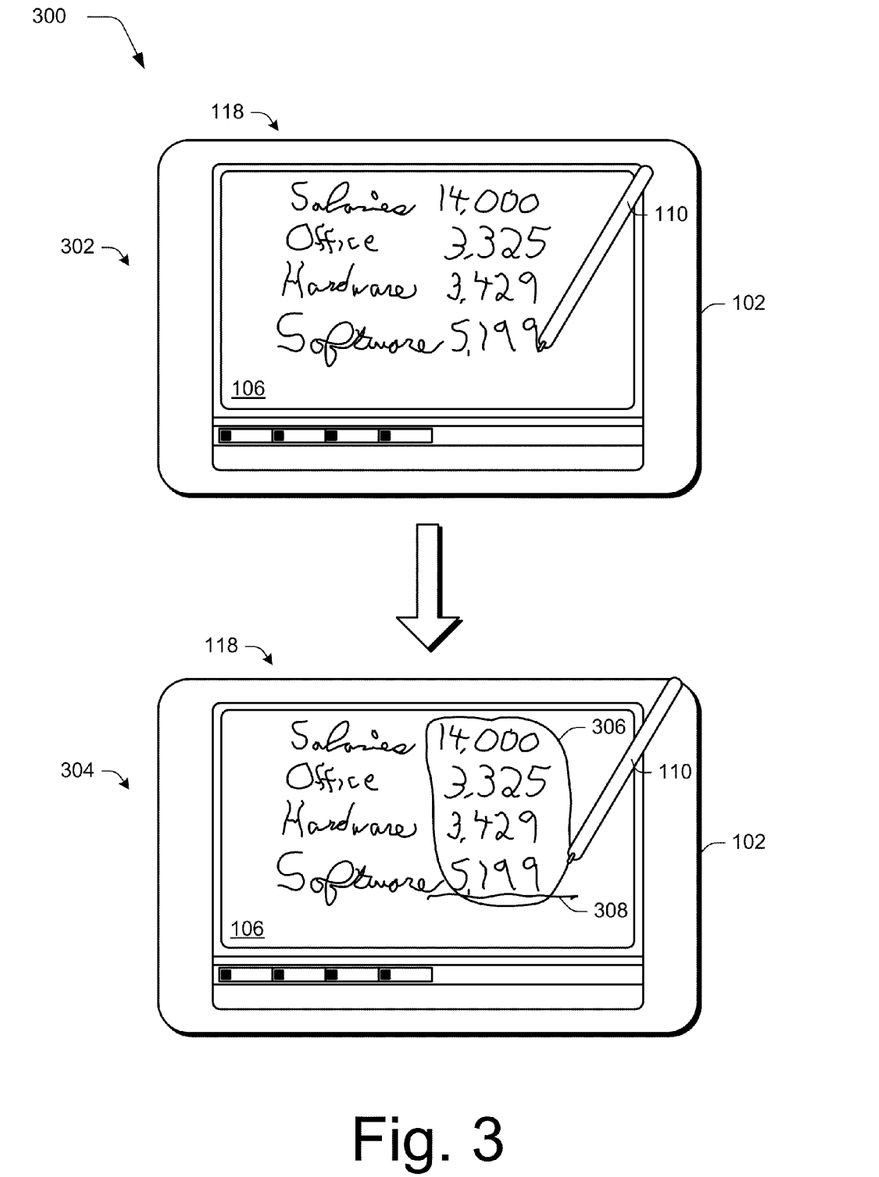
FIG. 3 depicts a system in an example implementation in which an area of a user interface output by the computing device of FIG. 1 is specified using a freeform selection.

FIG. 3 depicts a system 300 in an example implementation in which an area of a user interface output by the computing device 102 of FIG. 1 is specified using a freeform selection. The system 300 of FIG. 3 is illustrated as including first and second stages 302, 304. At the first stage 302, ink strokes 118 are handwritten and detected using touchscreen functionality of the computing device 102. For example, a finger of the user's hand 108, a stylus 110, and so on may be used to write the ink strokes 118 that are illustrated. In this example, the ink strokes 118 involves a listing of expenses for an office that include salaries, office, hardware, and software with corresponding numbered amounts that are also handwritten.

At the second stage 304, a freeform selection is made to define an area of the user interface displayed by the display device 106. The freeform selection may take a variety of forms, such as by at least partially enclosing an area of the user interface as shown by a first freeform selection 306 that is illustrated as approximating a circle. Thus, in this example the area within the line is to be the subject of a mathematical computation.

In another example, a second freeform selection 308 is illustrated as a line. In this example, the second freeform selection defines an area above the line to include numbers that are to be the subject of a mathematical computation. Like the first freeform selection 206 that at least partially encloses an area, in the illustrated example the second freeform selection 308 defines an area that includes ink strokes that represent the numbers "14,000," "3,325," "3,429," and "5,199." Additionally, the first and second freeform selections 306, 308 specify that the ink strokes in this area (e.g., above the second freeform selection 308) are to be the subject of a mathematical computation of addition, which may be specified as a default operation in this embodiment.

For instance, the computation module 112 may detect that presence of the freeform selection. The area that is defined by the freeform selection may then be used as a basis to convert the ink strokes 118 to text. In this way, processing resources of the computing device 102 may be conserved by converting text of an area of interest without converting other text, such as "salaries," "office," "hardware," and "software" as illustrated in the user interface output by the display device 106.

In implementations, the freeform selection may also be used to define a subset of permissible text characters. As illustrated in FIG. 3, for instance, the area may be limited to characters involved in basic mathematics, such as numbers and indications of mathematical computations. Therefore, the computing device 102 may efficiently determine that the characters after salaries reference the numbers "14,000" and not a letter "I" followed by a number "4" followed by three instances of the letter "O." Other implementations are also contemplated, such as implementations that use logic and machine learning such as not to limit which characters are permitted to be represented in the area. The numbers and/or operations identified by the ink analysis module 114 may then be used as the subject of a mathematical computation, further discussion of which may be found in relation to the following figure.

Figure 4:
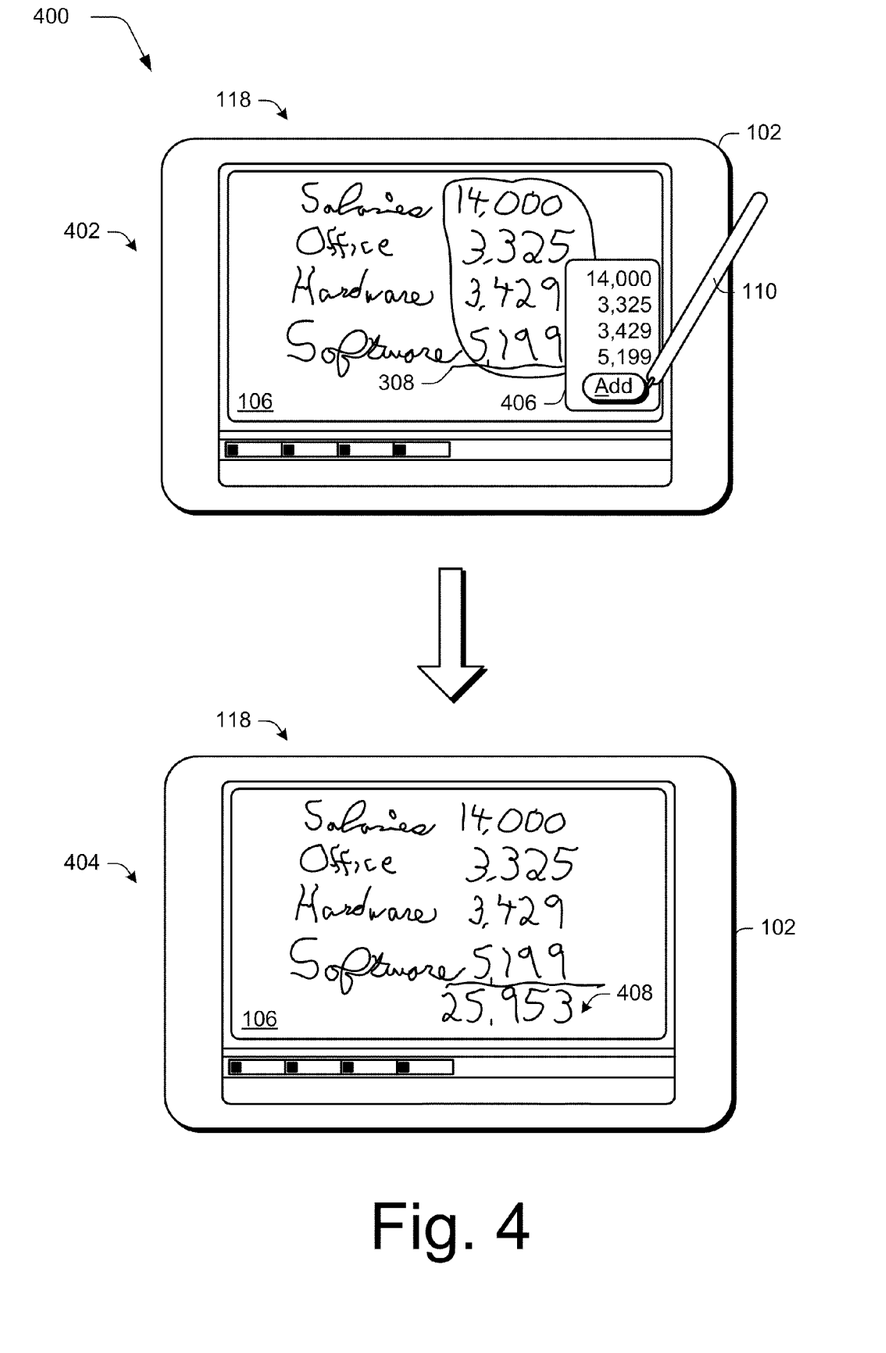
FIG. 4 depicts a system in an example implementation in which verification is output in a user interface to verify correctness of a text conversion and a mathematical computation is performed using the text, a result of which is output in the user interface.

FIG. 4 depicts a system 400 in an example implementation in which a verification is output in a user interface to verify correctness of a text conversion and a mathematical computation is performed using the text, a result of which is output in the user interface. The system 400 of FIG. 4 is also illustrated as including first and second stages 402, 404. At the first stage 402, the ink strokes 118 within the area defined by the freeform selection of FIG. 3 are converted into text using the ink analysis module 114.

A verification 406 of the conversion is also illustrated as being displayed by the display device 106. The verification 406 is configured to display the result of the conversion and may also be configured to accept inputs to correct the conversion. For instance, a user may use the stylus 110 to select in incorrect number in the verification 406 and input a correct number, such as through a drop down menu containing other likely results, using a keyboard, a handwritten correction, and so on.

The verification 406 is also illustrated as including a verification of a mathematical computation that is to be performed using the numbers in the text. For example, the ink analysis module 114 may also be configured to identify text and/or mathematical computation identifiers (e.g., basic mathematical computations such as "+," "−," "÷," "/," "*," "×," and so on) in the freeform text in the area specified by the freeform selection. In this example, a default mathematical computation of addition is identified. Accordingly, the verification 406 may include a portion that identifies the operation and/or is selectable to initiate performance of the operation, e.g., by tapping the stylus 110, pressing using a finger of the user's hand 108, a cursor control device, hitting "enter" on a keyboard, and so on.

Responsive to the selection of the portion 406, the text is passed to the calculation module 116 to perform the mathematical computation. A result of the mathematical computation is then displayed in the user interface by the display device 106, an example of which is illustrated in the second stage 404. In the illustrated embodiment, the result 408 is displayed using digital ink. It should be noted that in an implementation the freeform selection is removed (e.g., the first freeform selection 306 is no longer displayed) although other implementations are also contemplated, such as continued display of the second freeform selection 308 as illustrated.

Further, the result 408 is illustrated as having handwriting that mimics handwriting of the user's handwritten ink strokes in the area of the freeform selection. For instance, an ink converter module may receive the result as an input and use freeform lines and other techniques to mimic freeform lines to appear to have been input using the handwriting of the user. Thus, in this example the result 408 has a similar "look and feel" to other digital ink displayed in the user interface by the display device 106.

Although verification 406 has been described in relation to the example system 400, it should be readily apparent that the freeform mathematical computation techniques described herein may also be employed without verification. For example, the computation may be performed automatically and without further user intervention responsive to detection of the freeform selection, without outputting the verification 406. Additionally, although basic mathematical computations have been described, it should be readily apparent that a variety of other mathematical computations are also contemplated, further discussion of which may be found in relation to the following figures.

Figure 5:
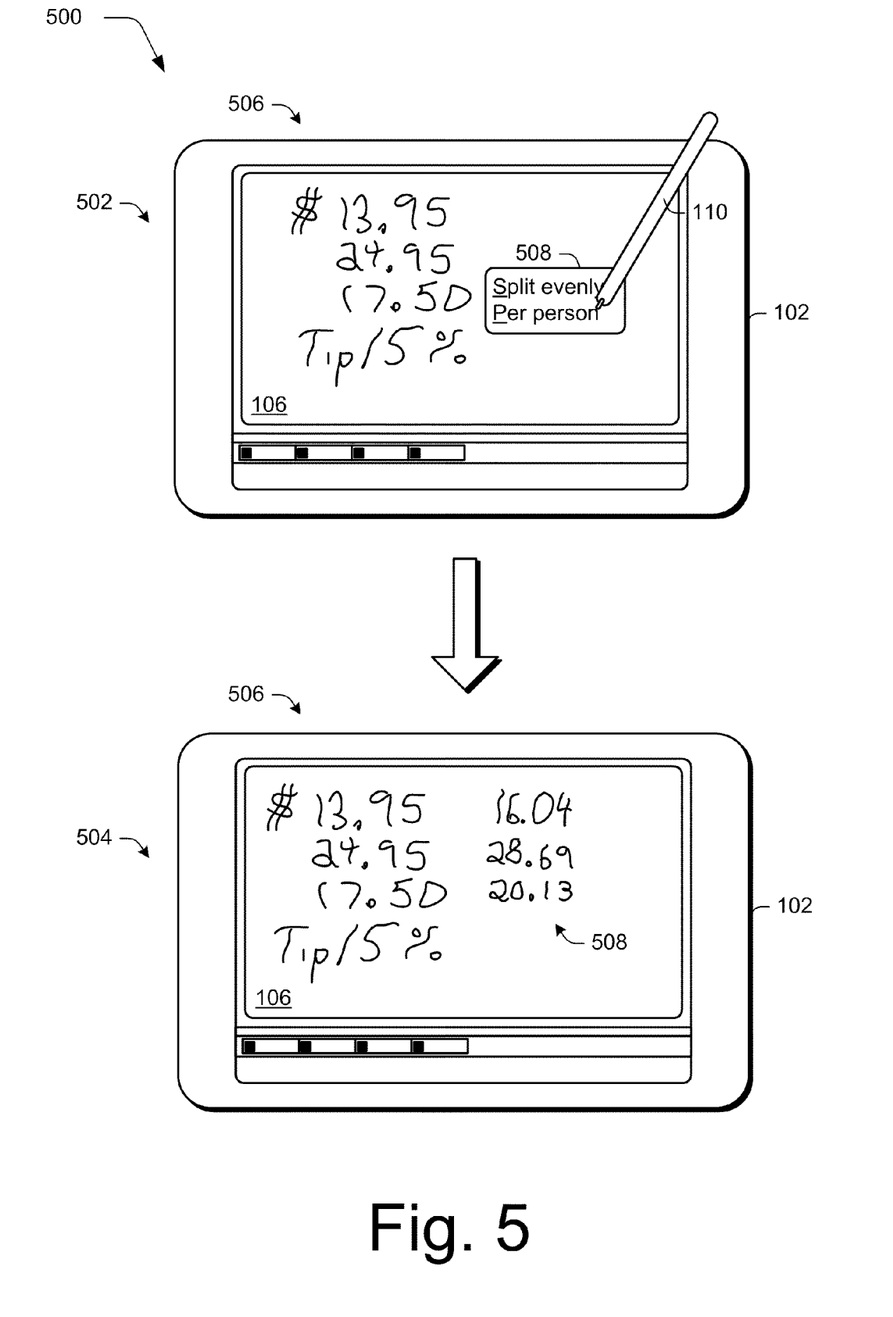
FIG. 5 depicts a system in an example implementation in which a freeform mathematical computation of a tip is performed.

FIG. 5 depicts a system 500 in an example implementation in which a freeform mathematical computation of a tip and splitting of a bill is performed. The system 500 of FIG. 5 is illustrated as including first and second stages 502, 504. At the first stage 502, ink strokes 506 are illustrated as specifying different dollar amounts of items of a tab at a restaurant. The ink strokes 506 also include a description of a mathematical computation of a "tip 15%." These ink strokes may or may not be within an area specified using a freeform selection (e.g., the ink analysis module 114 may examine each of the ink strokes that were input).

Responsive to identification of the mathematical computation, the computation module 112 may output a portion 508 to verify the mathematical computation to be performed, which in this instance includes the options to "split evenly" or "per person." In the illustrated example, the stylus 110 is illustrated as selected the "per person" option. The "split evenly" option involves dividing the total of the amounts and the tip evenly across the number of users. For example, the "split evenly" option may cause the total of the dinners to be increased by the tip amount, which is then split evenly by a number of diners. The "per person" option involved calculation of the tip for each individual user.

Responsive to the selection, results 508 of the mathematical computation are displayed in the user interface output by the display device 106 as shown in the second stage 504. As before, the results 508 may be output to mimic handwriting of a user that provided the handwritten ink and mathematical operation identifier (e.g., "tip"). Thus, in this example the first mathematical computation is identified from text (e.g., "tip") and a symbol (e.g., "%") by the computation module 112. A variety of other mathematical computations are also contemplated that may be identified from text converted from the ink strokes, another example of which may be found in relation to the following figure.

Figure 6:
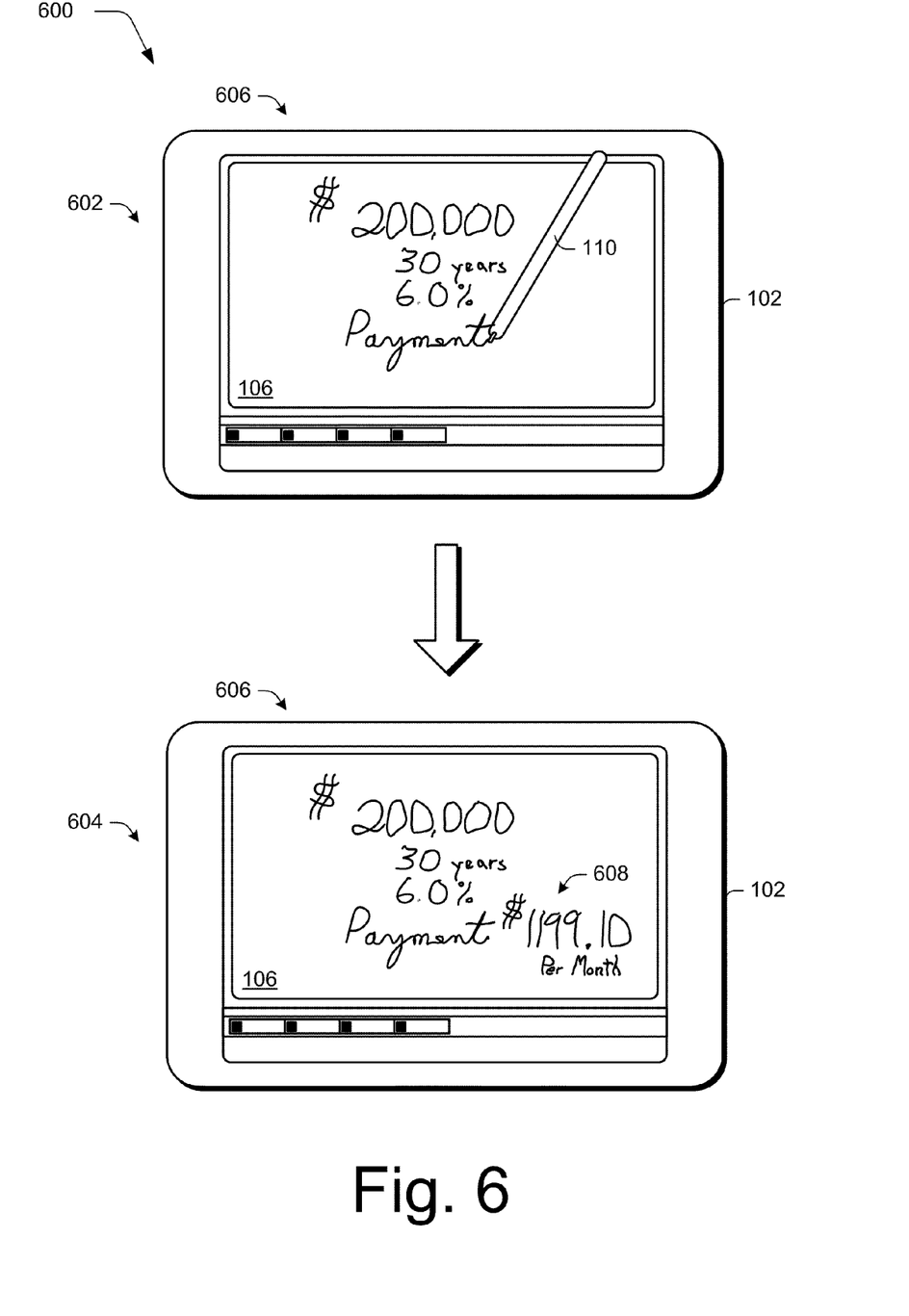
FIG. 6 depicts a system in an example implementation in which a freeform mathematical computation of a payment is performed.

FIG. 6 depicts a system 600 in an example implementation in which a freeform mathematical computation of a payment is performed. The system 600 of FIG. 6 is illustrated as including first and second stages 602, 604. At the first stage 602, freeform lines 606 are illustrated as specifying parameters involving a payment, which include a total to be paid (e.g., "$200,000"), a term (e.g., "30 years"), and an interest rate (e.g., "6.0%"). Another parameter is also specified but is left blank, which in this instance is "payment."

Accordingly, the freeform selection may trigger the computation module 112, to detect that the "blank" parameter is to be computed and calculate a result 608, which again is illustrated as being output to mimic handwriting of the digital ink 606 that served as a basis for the computation. Thus, the computation module 112 may perform a variety of different mathematical computations for parameters that do not have corresponding values, e.g., that do not have values within the freeform selection, based on parameters that do have values. Thus, the computation module 112 may identify the operation from the parameters described and corresponding values. Accordingly, it should be readily apparent that a wide variety of mathematical computations may be performed to solve a variety of different parameters without departing from the spirit and scope thereof, such as to perform a conversion of a currency or conversion from one unit to another (e.g. inches to centimeters).

Example Procedures

The following discussion describes computation techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-600 of FIGS. 2-6.

Figure 7:
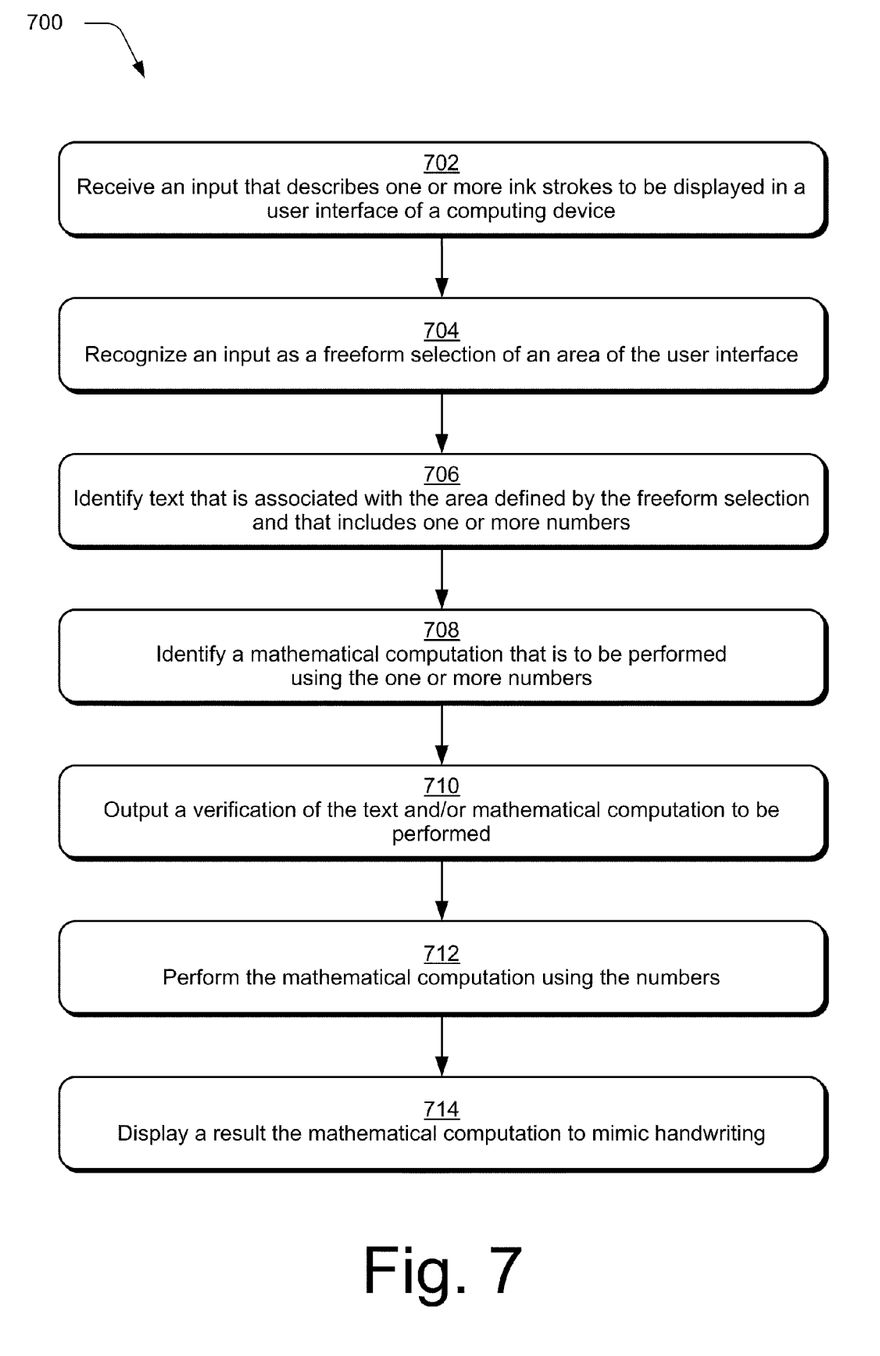
FIG. 7 is a flow diagram depicting a procedure in an example implementation in which performance of a freeform mathematical computation is described.

FIG. 7 depicts a procedure in an example implementation in which performance of a freeform mathematical computation is described. An input is received that describes one or more ink strokes to be displayed in a user interface of a computing device (block 702). For example, the stylus 110, a finger of the user's hand 108, a movement in a natural user interface (NUI) that is captured by a camera, and so on may be used to "draw" the ink strokes.

An input is recognized as a freeform selection of an area of the user interface (block 704). The freeform selection may take a variety of forms to define the area, such as to at least partially encompass the area, denote an area "above" the freeform selection (e.g., as shown by the second freeform selection 308), to the "side" of the freeform selection, e.g., by dividing into handwritten columns, and so on.

Text is identified that is associated with the area defined by the freeform selection and that includes one or more numbers (block 706). An ink analysis engine 114, for instance, may convert the ink strokes 118 to text using a variety of different ink classification techniques and handwriting recognition engines.

A mathematical computation is identified that is to be performed using the one or more numbers (block 708). Continuing with the previous example, the OCR techniques may be used to identify a symbol (e.g., "/"), a word (e.g., "divide"), and so on that references the mathematical computation.

A verification may be output of the text and/or mathematical computation to be performed (block 710). The verification may take a variety of forms, such as the verification 406 that is configured to accept corrections to the text as described in relation to FIG. 4.

The mathematical computation is performed using the number (block 712) and a result of the mathematical computation is displayed to mimic handwriting of the original ink strokes (block 714). Thus, the result may be displayed to give a similar look and feel to the ink strokes 118 input by a user and the result 408 generated by the computation module 112. A variety of other examples are also contemplated, such as to display the result in a predefined font, to display the text and the result in a predefined font, and so on.

Example Device

Figure 8:
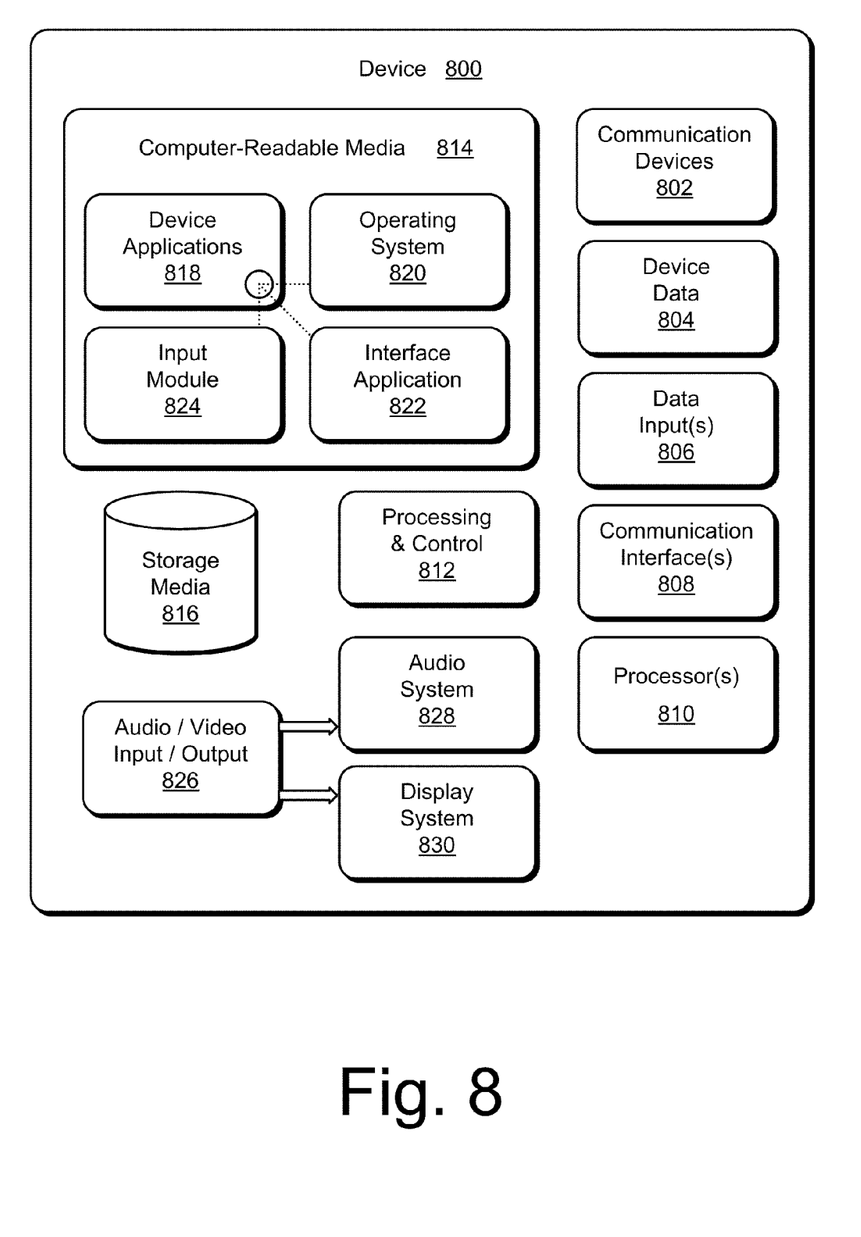
FIG. 8 illustrates various components of an example device that can be implemented as any type of portable and/or computer device as described with reference to FIGS. 1-6 to implement embodiments of the computation techniques described herein.

FIG. 8 illustrates various components of an example device 800 that can be implemented as any type of portable and/or computer device as described with reference to FIGS. 1-7 to implement embodiments of the computation techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more o\f a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of a touch pull-in gesture. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the gesture techniques described herein. In this example, the device applications 818 include an interface application 822 and an input module 824 (which may be the same or different as input module 112) that are shown as software modules and/or computer applications. The input module 824 is representative of software that is used to provide an interface with a device configured to capture inputs, such as a touchscreen, track pad, camera, and so on. Alternatively or in addition, the interface application 822 and the input module 824 can be implemented as hardware, software, firmware, or any combination thereof. Additionally, the input module 824 may be configured to support multiple input devices, such as separate devices to capture touch and stylus inputs, respectively. For example, the device may be configured to include dual display devices, in which one of the display device is configured to capture touch inputs while the other stylus inputs.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing an input as a freeform selection of an area of a user interface output by a computing device, the area including at least a plurality of numbers that are to be the subject of a mathematical computation;
   converting digital ink strokes associated with the area into text by the computing device;
   displaying the text within the user interface of the computing device adjacent at least a plurality of numbers in said area to verify that the converting was performed successfully; and
   performing a mathematical computation that involves the one or more numbers, and displaying a result of the mathematical computation to appear in freeform to mimic handwriting of the digital ink strokes.

2. A method as described in claim 1, wherein the user interface of the displaying is configured to receive one or more inputs to correct the text.

3. A method as described in claim 1, wherein the user interface of the displaying is configured to verify the mathematical computation that is to be performed, the mathematical computation identified from one or more of the digital ink strokes.

4. A method as described in claim 1, wherein the user interface of the displaying includes a portion that is selectable to initiate the performing of the mathematical computation.

5. One or more computer-readable storage memory comprising instructions that, responsive to execution on a computing device, cause the computing device to perform operations comprising:
   recognizing an input as a freeform selection that at least partially encloses an area of a user interface output by the computing device;
   converting one or more handwritten digital ink strokes within the area into text by the computing device, the one or more digital ink strokes representing one or more parameters of a mathematical computation;
   identifying the mathematical computation to be performed from at least one of the digital ink strokes representing the one or more parameters included in the area;
   detecting, from the one or more parameters, corresponding values to the one or more parameters and a blank parameter that is to be computed; and
   performing the identified mathematical computation using the corresponding values of the one or more parameters to compute the blank parameter, and displaying a result of the mathematical computation to appear in freeform to mimic handwriting of the digital ink strokes.

6. One or more computer-readable storage memory as described in claim 5, wherein the handwritten digital ink strokes are input using a stylus.

7. One or more computer-readable storage memory as described in claim 5, wherein the freeform selection is handwritten.

8. One or more computer-readable storage memory as described in claim 5, wherein the user interface output by the computing device is configured to receive one or more inputs to correct the text.

9. One or more computer-readable storage memory as described in claim 5, wherein the freeform selection that at least partially encloses the area of the user interface approximates a circle.

10. One or more computer-readable storage memory as described in claim 5, wherein the handwritten digital ink strokes are input using a finger of a user's hand.

11. One or more computer-readable storage memory comprising instructions that, responsive to execution on a computing device, cause the computing device to perform operations comprising:
    recognizing an input as a freeform selection of an area of a user interface output by the computing device, the area including at least a plurality of numbers that are to be the subject of a mathematical computation;
    converting digital ink strokes associated with the area into text by the computing device;
    displaying the text within the user interface of the computing device adjacent at least a plurality of numbers in said area to verify that the converting was performed successfully; and
    performing a mathematical computation that involves the one or more numbers, and displaying a result of the mathematical computation to appear in freeform to mimic handwriting of the digital ink strokes.

12. One or more computer-readable storage memory as described in claim 11, wherein the user interface of the displaying is configured to receive one or more inputs to correct the text.

13. One or more computer-readable storage memory as described in claim 11, wherein the user interface of the displaying is configured to verify the mathematical computation that is to be performed, the mathematical computation identified from one or more of the digital ink strokes.

14. One or more computer-readable storage memory as described in claim 11, wherein the user interface of the displaying includes a portion that is selectable to initiate the performing of the mathematical computation.

15. A method comprising:
    recognizing an input as a freeform selection that at least partially encloses an area of a user interface output by a computing device;
    converting one or more handwritten digital ink strokes within the area into text by the computing device, the one or more digital ink strokes representing one or more parameters of a mathematical computation;
    identifying the mathematical computation to be performed from at least one of the digital ink strokes representing the one or more parameters included in the area;
    detecting, from the one or more parameters corresponding values to the one or more parameters and a blank parameter that is to be computed; and
    performing the identified mathematical computation using the corresponding values of the one or more parameters to compute the blank parameter, and displaying a result of the mathematical computation to appear in freeform to mimic handwriting of the digital ink strokes.

16. A method as described in claim 15, wherein the handwritten digital ink strokes are input using a stylus.

17. A method as described in claim 15, wherein the freeform selection is handwritten.

18. One or more computer-readable storage memory as described in claim 15, wherein the user interface output by the computing device is configured to receive one or more inputs to correct the text.

19. One or more computer-readable storage memory as described in claim 15, wherein the freeform selection that at least partially encloses the area of the user interface approximates a circle.

20. One or more computer-readable storage memory as described in claim 15, wherein the handwritten digital ink strokes are input using a finger of a user's hand.

* * * * *